United States Patent
Lai et al.

(10) Patent No.: US 10,442,909 B2
(45) Date of Patent: Oct. 15, 2019

(54) CONSTITUENT FOR PRODUCING SHOCK-ABSORBING COMPOSITE MATERIAL, SHOCK-ABSORBING COMPOSITE MATERIAL, AND PRODUCTION METHOD THEREOF

(71) Applicant: NATIONAL CHUNG SHAN INSTITUTE OF SCIENCE AND TECHNOLOGY, Taoyuan (TW)

(72) Inventors: Teh-Long Lai, Taoyuan (TW); Chin-Wei Chun, New Taipei (TW); Shyh-Chi Wu, Taoyuan (TW); Yung-Hsien Liu, New Taipei (TW)

(73) Assignee: NATIONAL CHUNG SHAN INSTITUTE OF SCIENCE AND TECHNOLOGY, Taoyuan (TW)

( * ) Notice: Subject to any disclaimer, the term of this patent is extended or adjusted under 35 U.S.C. 154(b) by 133 days.

(21) Appl. No.: 15/813,711

(22) Filed: Nov. 15, 2017

(65) Prior Publication Data

US 2019/0144623 A1    May 16, 2019

(51) Int. Cl.

| C08J 9/00 | (2006.01) |
|---|---|
| C08J 9/35 | (2006.01) |
| A41D 13/015 | (2006.01) |
| C08J 9/228 | (2006.01) |
| C08L 23/08 | (2006.01) |
| C08L 31/04 | (2006.01) |

(Continued)

(52) U.S. Cl.
CPC .......... *C08J 9/0061* (2013.01); *A41D 13/015* (2013.01); *A41D 31/28* (2019.02); *B29C 35/02* (2013.01); *C08J 9/228* (2013.01); *C08L 9/06* (2013.01); *C08L 23/0853* (2013.01); *C08L 31/04* (2013.01); *C08L 83/04* (2013.01); *C08J 2201/02* (2013.01); *C08K 3/36* (2013.01); *C08L 2205/035* (2013.01); *C08L 2205/22* (2013.01); *C08L 2207/04* (2013.01)

(58) Field of Classification Search
CPC ......... C08J 9/0061; C08J 9/228; A41D 31/28; A41D 13/015; B29C 35/02; C08K 3/26
See application file for complete search history.

(56) References Cited

U.S. PATENT DOCUMENTS

| 2007/0029690 A1* | 2/2007 | Green | C08J 3/005 264/50 |
|---|---|---|---|
| 2017/0215522 A1* | 8/2017 | Tateishi | A43B 13/04 |

FOREIGN PATENT DOCUMENTS

| JP | H11-206406 | * 8/1999 |
|---|---|---|
| TW | 201602244 | 1/2016 |

* cited by examiner

*Primary Examiner* — Kara B Boyle
(74) *Attorney, Agent, or Firm* — Schmeiser, Olsen & Watts, LLP

(57) ABSTRACT

A constituent for producing a shock-absorbing composite material comprises 50-80 wt % primary matrix including vinyl acetate; ethylene/vinyl acetate copolymer; 10-40 wt % secondary matrix including polyethylene; styrene-butadiene rubber; a thermoplastic elastomer; and 1-20 wt % additive. A shock-absorbing composite material which contains the constituent and a production method thereof are further introduced. The shock-absorbing composite material is applicable to sports equipment (say, shoe pads, clubs and rackets), medical care (say, care-oriented clothes for the elderly, the sick, the injured, and the handicapped), and applications related to impact protection (say, helmets and bumpers.) The shock-absorbing composite material is applied to defense industry.

10 Claims, 1 Drawing Sheet step 1: mull the constituent of embodiment 1-1 — S101 step 2: foam the mulled constituent — S102

(51) Int. Cl.
  *C08L 9/06* (2006.01)
  *C08L 83/04* (2006.01)
  *B29C 35/02* (2006.01)
  *A41D 31/28* (2019.01)
  *C08K 3/36* (2006.01)

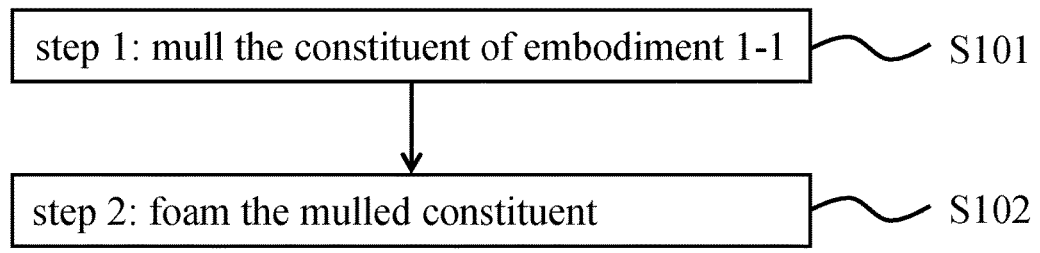

CONSTITUENT FOR PRODUCING SHOCK-ABSORBING COMPOSITE MATERIAL, SHOCK-ABSORBING COMPOSITE MATERIAL, AND PRODUCTION METHOD THEREOF

FIELD OF THE INVENTION

The present invention relates to constituents for producing shock-absorbing composite materials and, more particularly, to an ethylene/vinyl acetate copolymer-containing constituent for producing a shock-absorbing composite material. The present invention also relates to a shock-absorbing composite material which contains the constituent and a production method thereof.

BACKGROUND OF THE INVENTION

Thanks to development of modern industry and extreme leisure and sports, every field has to address urgently two severe issues, namely vibrations and impacts. Vibrations and impacts may deteriorate operation precision, reduce service life of products, pose hazards to workers, and cause environmental pollution. Hence, it is important to absorb and abate vibrations and impacts.

Conventional shock-absorbing pads in wide use have drawbacks as follows: high rubber viscosity, poor oil resistance, poor damping performance, poor impact resistance, poor fatigue resistance and high costs. Although shear thickening fluids are good at damping and highly resistant to impacts, they are liquid and thus hardly practicable.

Ordinary composite fluids have their viscosity reduced under a shear force. By contrast, the viscosity (within a specific range thereof) of shear thickening fluids, which are non-Newtonian fluids, is proportional to the shear force; hence, shear thickening fluids turn rigid under an external force.

Conventional shear thickening fluids are composed of polyethylene glycol and silicon dioxide composite. However, they are neither stable nor resistant to a shear force, because polyethylene glycol is highly hygroscopic.

A conventional method of making a damping pad method involves mixing and blending a matrix with various additives in a phase-separation manner, mulling the mixture at a predetermined temperature, and foaming the mulled mixture with a specific die. With the matrix being different from the additives in the materials they are made of, the resultant damping pad is problematic in terms of quality, performance, production costs, and environmental protection.

SUMMARY OF THE INVENTION

Colloidal solutions, which are shear thickening fluids, are of high fluidity and thus must be coated on a carrier; as a result, they make up a low percent (a maximum of 20%) of shock-absorbing composite materials by weight. The present invention enables a shear thickening solution to be directly synthesized, foamed and cured to therefore dispense with the traditional need for coating colloidal solutions on a carrier, integrally form a shock-absorbing pad, increase effective material content, thereby enhancing damping.

The present invention employs a manufacturing process of vinyl acetate composite colloid to shape constituents of energy-dispersed colloid/vinyl acetate by foaming, shaping and curing and then produce a shock-absorbing composite material in accordance with structural requirements of damping. The shock-absorbing composite material thus produced is widely applicable to personal security equipment, sports equipment protective equipment, as well as packing (covering) materials for high-precision instruments and 3C products.

It is an objective of the present invention to provide a constituent for producing a shock-absorbing composite material whereby an impact-resistant shock-absorbing composite material is produced.

In order to achieve the above and other objectives, the present invention provides a constituent for producing a shock-absorbing composite material, comprising:

primary matrix making up 50-80 percent of the constituent by weight and comprising:
vinyl acetate;
ethylene/vinyl acetate copolymer;
secondary matrix making up 10-40 percent of the constituent by weight and comprising:
polyethylene;
styrene-butadiene rubber;
thermoplastic elastomer; and
additive making up 1-20 percent of the constituent by weight.

In an embodiment of the present invention, the secondary matrix further comprises:
binary silicon oxide comprising:
silicon dioxide particles; and
polydimethylsiloxane.

In an embodiment of the present invention, the constituent comprises 9-18 wt % binary silicon oxide.

In an embodiment of the present invention, vinyl acetate makes up 60-90 percent of the ethylene/vinyl acetate copolymer by weight.

In an embodiment of the present invention, the additive is one selected from the group consisting of a foaming agent, a foaming aid, a cross-linking agent, a cross-linking aid, colored particle and a filler.

In an embodiment of the present invention, the constituent comprises 5-7 wt % vinyl acetate and 45-63 wt % ethylene/vinyl acetate copolymer.

In an embodiment of the present invention, the constituent comprises 6-18 wt % polyethylene, 3-6 wt % styrene-butadiene rubber, and 2-4 wt % thermoplastic elastomer.

In an embodiment of the present invention, the thermoplastic elastomer is styrene ethylene butylene styrene block copolymer (SEBS).

Another objective of the present invention is to provide a shock-absorbing composite material to enhance resistance to impacts.

In order to achieve the above and other objectives, the present invention provides a shock-absorbing composite material formed by mulling the constituent and foaming the mulled constituent.

Yet another objective of the present invention is to provide a production method of a shock-absorbing composite material whereby an impact-resistant shock-absorbing composite material is produced.

In order to achieve the above and other objectives, the present invention provides a production method of a shock-absorbing composite material, comprising the steps of:
mulling the constituent; and
foaming the mulled constituent.

Accordingly, the constituent for producing a shock-absorbing composite material, the shock-absorbing composite material and the production method thereof, provided according to the present invention, are effective in producing an impact-resistant shock-absorbing composite material.

BRIEF DESCRIPTION OF THE DRAWINGS

Objectives, features, and advantages of the present invention are hereunder illustrated with specific embodiments in conjunction with the accompanying drawings, in which:

FIG. 1 is a schematic view of the process flow of a production method of a shock-absorbing composite material according to embodiment 2-1 of the present invention.

DETAILED DESCRIPTION OF THE PREFERRED EMBODIMENTS

Embodiment 1: Constituent for producing shock-absorbing composite material

The constituent for producing a shock-absorbing composite material according to embodiments 1-1~1-4 is prepared in accordance with ingredient proportions shown in Table 1, but the present invention is not limited thereto.

TABLE 1

| | | embodiment 1-1 | embodiment 1-2 | embodiment 1-3 | embodiment 1-4 |
|---|---|---|---|---|---|
| primary matrix | VA (%) | 7 | 7 | 5 | 5 |
| | EVA (%) | 63 | 63 | 45 | 45 |
| secondary matrix | PE (%) | 6 | 15 | 12 | 18 |
| | SBR (%) | 3 | 3 | 6 | 6 |
| | SEBS (%) | 2 | 2 | 4 | 4 |
| | binary silicon oxide (%) | 9 | 0 | 18 | 12 |
| additive | foaming agent (%) | 2.5 | 2.5 | 2.5 | 2.5 |
| | foaming aid (%) | 1.5 | 1.5 | 1.5 | 1.5 |
| | cross-linking agent (%) | 0.8 | 0.8 | 0.8 | 0.8 |
| | cross-linking aid (%) | 0.7 | 0.7 | 0.7 | 0.7 |
| | colored particle (%) | 0.5 | 0.5 | 0.5 | 0.5 |
| | filler (%) | 4 | 4 | 4 | 4 |

Ingredient proportions shown in Table 1 are expressed by wt %. VA denotes vinyl acetate. EVA denotes ethylene-vinyl acetate copolymer. PE denotes polyethylene. SBR denotes styrene-butadiene rubber. SEBS denotes styrene ethylene butylene styrene block copolymer, which is a thermoplastic elastomer. The aforesaid ingredients are commercially available.

A production method of the binary silicon oxide included in the secondary matrix of embodiments 1-1~1-4 is disclosed in Taiwan's published patent application 201602244.

The binary silicon oxide is produced by following the steps below.

Step 1: mixing silicon dioxide particles of a particle diameter of 50 nm~500 μm, polydimethylsiloxane of a molecular weight of 200~5000, and an appropriate amount of additive to form a mixed solution which contains silicon dioxide and polydimethylsiloxane, leaving the mixed solution undisturbed such that micro-bubbles in the mixed solution are uniformly distributed to form a raw material for a colloidal solution. The silicon dioxide particles and polydimethylsiloxane make up 12~60% of the mixed solution by weight.

Step 2: mixing an appropriate amount of a cross-linking agent with the colloidal solution raw material to form a colloidal solution plastic material, wherein the cross-linking agent is siloxane monomer or its polymer (such as PU or EVA).

Step 3: filling a die with the colloidal solution plastic material. The die is manufactured according to requirements for absorption of impact energy, impact stress simulation analysis, and structural design and is made of a metal which tolerates a temperature of 200° C. The surface of the colloidal solution plastic material undergoes passivation treatment to facilitate mold release. The colloidal solution plastic material is heated at 80~120° C. for 2~4 hours and thus cured to form binary silicon oxide.

Embodiment 2: Shock-absorbing composite material and production method thereof.

Embodiment 2-1:

The production method for the shock-absorbing composite material of embodiment 2-1 is illustrated by FIG. 1. Its steps comprise: step 1 (S101): mulling the constituent of embodiment 1-1; and step 2 (S102): foaming the mulled constituent. In this embodiment, the shock-absorbing composite material is used to make shock-absorbing pads (20 mm thick each) which are then processed and tested.

The present invention is not restrictive of the mulling technique and conditions in step 1; hence, whatever mulling technique and conditions in step 1 will be feasible, provided that ingredients of the constituent in embodiment 1-1 are sufficiently mixed. Preferably, the constituent of embodiment 1-1 is placed in a blender and mulled at 80~150° C. for 15~30 minutes therein to form a mixture of high plasticity. Afterward, the mixture of high plasticity is further mulled with double rollers at 80~30° C. for 3~6 minutes.

The present invention is not restrictive of the foaming technique and conditions in step 2; hence, conventional foaming methods well known among persons skilled in the art are applicable to step 2. Preferably, a cross-linking foaming process is performed in one single instance with a batched oil hydraulic press at 130~160° C. for 30~50 minutes, wherein the foaming limit pressure of the oil hydraulic press is preferably 150 kg/cm²~250 kg/cm².

Embodiment 2-2:

Embodiment 2-2 is similar to embodiment 2-1 except that its step 1 involves mulling the constituent of embodiment 1-2.

Embodiment 2-3:

Embodiment 2-3 is similar to embodiment 2-1 except that its step 1 involves mulling the constituent of embodiment 1-3.

Embodiment 2-4:

Embodiment 2-4 is similar to embodiment 2-1 except that its step 1 involves mulling the constituent of embodiment 1-4.

Test Example:

The shock-absorbing composite material of embodiments 2-1~2-4 is tested in accordance with the test procedures of 20 kN (EN 1621-1:2012 Motorcyclists' Protective Clothing against Impacts) and TM142 Energy Absorption Test and under the condition of 50 J of impact energy. The findings of the test are shown in Table 2 below.

TABLE 2

|  | embodiment 2-1 | embodiment 2-2 | embodiment 2-3 | embodiment 2-4 |
|---|---|---|---|---|
| EN1621 Impact Test (KN) | P1: 10.4<br>P2: 10.0<br>P3: 10.3 | P1: 62.2<br>P2: 63.7<br>P3: 59.5 | P1: 9.01<br>P2: 9.12<br>P3: 9.03 | P1: 9.11<br>P2: 9.19<br>P3: 9.57 |
| TM142 Energy Absorption Test (g) | 15 | 24 | 15 | 15 |

As shown by the findings of the test, the constituent for producing a shock-absorbing composite material according to the present invention is foamed and cured to produce a shock-absorbing composite material which is then found, by the test, to meet the standard of low-g energy absorption. The shock-absorbing composite material is applicable to sports equipment (say, shoe pads, clubs and rackets), medical care (say, care-oriented clothes for the elderly, the sick, the injured, and the handicapped), and applications related to impact protection (say, helmets and bumpers.) The shock-absorbing composite material is applied to defense industry.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A constituent for producing a shock-absorbing composite material, comprising:
    primary matrix making up 50-80 percent of the constituent by weight and comprising:
        vinyl acetate;
        ethylene/vinyl acetate copolymer;
    secondary matrix making up 10-40 percent of the constituent by weight and comprising:
        polyethylene;
        styrene-butadiene rubber;
        thermoplastic elastomer; and
    additive making up 1-20 percent of the constituent by weight.

2. The constituent of claim 1, wherein the secondary matrix further comprises:
    binary silicon oxide comprising:
        silicon dioxide particles; and
        polydimethylsiloxane.

3. The constituent of claim 2, further comprising 9-18 wt % binary silicon oxide.

4. The constituent of claim 1, wherein, by weight, vinyl acetate makes up 60-90 percent of the ethylene/vinyl acetate copolymer.

5. The constituent of claim 1, wherein the additive is one selected from the group consisting of a foaming agent, a foaming aid, a cross-linking agent, a cross-linking aid, colored particle and a filler.

6. The constituent of claim 1, comprising 5-7 wt % vinyl acetate and 45-63 wt % ethylene/vinyl acetate copolymer.

7. The constituent of claim 1, comprising 6-18 wt % polyethylene; 3-6 wt % styrene-butadiene rubber; and 2-4 wt % thermoplastic elastomer.

8. The constituent of claim 1, wherein the thermoplastic elastomer is styrene ethylene butylene styrene block copolymer.

9. A shock-absorbing composite material, formed by mulling the constituent of claim 1 and foaming the mulled constituent.

10. A production method of a shock-absorbing composite material, comprising the steps of:
    mulling the constituent of claim 1; and
    foaming the mulled constituent.

* * * * *